United States Patent Office 3,376,363
Patented Apr. 2, 1968

3,376,363
PROCESS FOR CRUMB SLURRY BLENDING AFTER RECOVERY IN POLYBUTADIENE PRODUCTION
Norman F. McLeod, Nederland, Tex., assignor to Texas-U.S. Chemical Company, Parsippany, N.J., a corporation of Delaware
No Drawing. Filed Mar. 26, 1963, Ser. No. 267,917
4 Claims. (Cl. 260—894)

This invention relates to a process for the blending of synthetic rubber type polymer products, which are produced by solution methods. In particular, the invention is concerned with the preparation of polymers in such a way that the blending of a group of individual polymers to produce a polymer composition having a given set of properties is simplified.

It is a well understood practice in the art that the ultimate properties of synthetic polymer compositions are determined by the properties of the individual polymers which are blended in the composition. The composition may consist of two, three or more compatible polymers of specified chemical identity, which are blended while in solution to produce a final composition having specific physical properties. It is in this preparation of the polymer compositions from individual polymers, where the process of crumb-slurry blending is most useful.

In the practice of solution polymerization, it is customary to carry out the process so that after the polymerization is shortstopped, and antioxidant has been added to the solution, the material passes on to a storage vessel where it is held until blended with other polymer solutions. Solutions stored at elevated temperatures (140° F.) in blend-tanks have the disadvantage of allowing unreacted monomer to polymerize. For example, unreacted butadiene in small amounts will polymerize to form vinyl cyclobutadiene (butadiene dimer). The amount of such dimer formed is a function of storage-time and temperature. Dimer formation can be minimized by stripping operations, in which the solution is steam-stripped after blending, leaving the polymer in an aqueous slurry form, consisting of a water suspension of solid polymer particles, which can be filtered off, dried and packaged. During the stripping operations, solvent and catalyst are recovered.

It can be seen that any improvement which hastens the blending and speeds the steam stripping will have, amongst other advantages, the effect of reducing undesirable dimer formation.

It is, therefore, a basic object of this invention to improve the process of forming polymer compositions by blending the polymer components in slurry form.

The invention, accordingly, is particularly concerned with the storing and blending of polymers of the synthetic rubber type made by solution methods, such as cis-1,4-polybutadiene. In the practice of the process herein disclosed, the polymer solution is injected into a liquid water bath, held at any temperature up to boiling, to induce separation of the polymer as a solid finely divided crumb, while the solvent is simultaneously steam stripped from the polymer. The slurries thus prepared contain polymers having individual sets of properties dependent upon the nature of the polymer and the conditions of preparation. It has been discovered that a variety of individual polymers in the form of these slurries may thereafter be blended to give a final polymer composition having a desired set of physical properties.

It will be evident that, because of this invention, it is no longer necessary to preserve large quantities of polymer solutions and the need for special storage equipment is thereby eliminated. Storage of solutions also involves the removal of large quantities of solvent from the process stream, because polymers are usually present in 5–20 percent concentrations. The process in this invention ties up a minimum amount of solvent, since the solvent in use is continually being returned to the polymerization cycle from the steam stripper, with none being removed from the system and stored.

Finally, the viscosities of the slurries are in the region of 1 centipoise and, therefore, require small mixing equipment which is not expensive to operate. Polymer solution viscosities, which are in the range 500 to 100,000 centipoises, lead to extraordinary equipment requirements when blending is to be done.

In the novel process of this invention, the synthetic rubbery polymer solution, after leaving the polymerization reactor and treatment with antioxidant and shortstopping agent, enters the top of the steam stripper, which has been charged with water to about one-half of its volumetric capacity. The polymer solution, containing up to 15 percent polymer, but preferably 6 to 10 percent, enters the steam stripper at a temperature of 50° F. to 180° F., and preferably at 140° F. The water in the stripper is maintained at a temperature of 150° to 250° F. depending on the stripper pressure. Higher stripper pressures require higher temperatures. The pressure maintained in the stripper can vary from 0 to 45 pounds per square inch gauge.

For a system using benzene as a solvent, the desired stripping temperature is 190° F., at three pounds per square inch gauge pressure. In such a system, 0.2 pound of steam/pound of hydrocarbon escapes with the hydrocarbon vapors leaving the stripper. An additional 0.3 pound steam/pound of hydrocarbon is required to heat the feed from 140° to 190° F. and to vaporize the solvent. Total steam requirements are 0.5 pound/pound hydrocarbon. The steam passes through the liquid in the lower part of the stripper, makes contact with the feed stream entering the top, evaporates the feed solvent, and leaves the polymer product as a crumb slurry in the liquid. The polymer crumb slurry is then transferred to a storage vessel or a blending tank where products of specific physical properties can be prepared.

Specific technique illustrating the process is set forth in the following examples:

Example I

To demonstrate that cis - 1,4 - polybutadiene can be blended continuously in the crumb slurry form to yield a final product having desired physical properties, in this instance, a Mooney viscosity between 50 and 60, a 10 percent solution of butadiene, in benzene, was fed into a 67 gallon reactor, and polymerized with the catalyst as described in abandoned application Ser. No. 38,417, filed June 24, 1960. The polymerization proceeded according to the data given in the following table at a temperature held in the range 140° to 155° F.

| Time (hrs.) | Total Charge (lb./hr.) | Product Solids (wt. percent) | Mooney Viscosity (ML-4) |
|---|---|---|---|
| Start | 283 | 8.3 | 78.5 |
| 6 | 283 | 7.3 | 39 |
| 8 | 283 | 8.4 | 36 |

After addition of antioxidant and shortstopping agent, the product stream was passed on to a blowdown tank to await steam stripping.

The stripper was fed continuously during polymerization according to the conditions tabulated below:

| Time | Feed Rates (lb./hr.) | | Stripper Temp. (° F.) | Stripper Pressure, p.s.i. |
|---|---|---|---|---|
| | Solution | Water Steam | | |
| Start | 320 | 1,350 | 190 | 2 |
| 1 | 320 | 1,350 | 190 | 2 |
| 4½ | 320 | 1,350 | 190 | 2 |
| 5½ | 320 | 1,350 | 190 | 1 |
| 6½ | 320 | 1,350 | 190 | 1 |
| 7½ | Stripping Completed | | | |

The hot wear/rubbery polymer slurry was continuously transferred from the stripper to the slurry blend tank, where, at the end of the stream stripping operation, all the slurry collected was blended and passed on for final processing. Agitation for the blending of the slurry was provided by a 12 inch diameter, vertical blade, turbine mixer, in the tank, which was 7 feet in diameter and 7 feet in height.

During the polymerization and stripping of the polymer solution, samples were withdrawn to determine their Mooney viscosity. The initial raw Mooney value was found to be 78.5. After 6 hours stripping, the value was 39, and after 8 hours, it was 36.

After blending the aqueous slurry, the rubbery polymer was separated from the water on a shaker screen, and dried in 25 pound lots in a 1A Banbury drier. The total yield of product was 190 pounds. Samples of the final material showed Mooney viscosities of 59 and 59½, which were within the projected 50 to 60 Mooney range. The uniformity of material after Banbury drying was excellent as shown by the agreement between Mooney viscosities.

Example II

The following demonstrates the production of a uniform polymer by the crumb slurry blending of individual crumb slurry batches.

Individual polymer solutions were prepared as in Example I. Upon leaving the reactor, a shortstopping agent and an antioxidant were added to the polymer solution, which was then stored in a blend tank. After collecting two such runs in separate tanks, the individual polymer solutions were steam stripped individually, converted to slurry form, and transferred to a slurry blend tank for blending. After blending, the solid crumb was removed from the slurry tank and Banbury dried in 25 pound lots. The pertinent data are tabulated in the following table:

| Run Number | 1 | 2 |
|---|---|---|
| Volume (gallons) | 540 | 375 |
| Percent solids (by weight) | 6.5 | 6.8 |
| Solution viscosity (cps.) | 230 | 620 |
| Mooney viscosity of a finished polymer sample (polybutadiene) | 38 | 64 |
| Weight | 252 | 150 |

Blend data

| | |
|---|---|
| Volume of slurry (gallons) | 1000 |
| Wt. of finished product (lbs.) | 412 |
| Slurry viscosity (cps.) | <1 |
| Final Mooney viscosity after Banbury drying | 50, 50.5 |

It will be noted from the data that slight increases in the solid content (from 6.5% in Run 1 to 6.8% in Run 2) result in large increases in the solution viscosity (230 to 620 centipoises). Solution viscosity in the intended range of 7.5% polymer would vary from 500 to 5000 cps. As can be seen from the volume and viscosity data, the importance and the value of this invention lie in the fact that instead of blending 1000 gallons of solution having a viscosity between 230 and 620 cps., the operation is performed on 1000 gallons of slurry having a viscosity of less than 1 cps. Furthermore, the Mooney viscosity measurements on the final polymer composition produced show no loss in uniformity through use of this invention.

Example III

The following, like Example II, demonstrates the crumb production of a polymer having a Mooney viscosity of 31. As can be seen from the data in the following table, a high degree of uniformity in the final polymer is achieved by the practice of this invention.

| Run Number | 1 | 2 |
|---|---|---|
| Volume (gallons) | 924 | 759 |
| Percent solids | 5.4 | 4.1 |
| Solution viscosity (cps.) | 122 | 113 |
| Mooney viscosity of a finished polymer sample (polybutadiene) | 26.5 | 40 |

Blend data

| | |
|---|---|
| Volume of slurry (gallons) | 1000 |
| Weight of finished product (lbs.) | 572 |
| Slurry viscosity (cps.) | <1 |
| Final Mooney viscosity after Banbury drying | 31, 30.5 |

Following the technique of Examples I, II and III, blends of solution polymers or solution polymers and emulsion polymers can be prepared. From individual polymers of known viscosity, it is possible, through this invention, to formulate composite blends of desired viscosity with no difficulty. The great convenience, in addition to eliminating dimer formation, lies in the fact that polymer solutions are notoriously viscous, even though they contain only 5–20 percent polymer.

Blends of polymers conventionally must be made with compatible polymers in compatible solvents. Relatively small batches require extraordinary large and powerful equipment.

Accordingly, preparation of aqueous slurries and blending such slurries as described herein leads to significant conveniences in operation.

What is claimed is:

1. The process of preparing polymer blends starting with polymer crumb which comprises forming individual polymers in solid finely divided crumb form as aqueous slurries, blending the aqueous slurries in appropriate quantities to obtain compositions having desired physical properties, separating the blended solids and drying said solids.

2. The process in accordance with claim 1 in which the polymer blend is prepared from cis-1,4-polybutadienes.

3. The process in accordance with claim 1 in which individual batches of cis-1,4-polybutadiene in hydrocarbon solution are stripped with steam in a steam stripping operation at a temperature of about 190° F. with the formation of separate water polymer crumb slurries; the separate slurries being thereafter blended as water slurries to give a solid liquid mixture, the viscosity value of the blended mixture of polymers having adjusted to the desired level, and thereafter separating the water and recovering the polymer crumb.

4. The process in accordance with claim 1 in which the polymer blend is prepared from a copolymer of styrene and butadiene and cis-1,4-polybutadiene.

References Cited

UNITED STATES PATENTS

| 2,560,031 | 7/1951 | Cline | 260—894 |
| 2,959,561 | 11/1960 | Kelley | 260—29.7 |
| 3,010,936 | 11/1961 | Irvin | 260—876 |

MURRAY TILLMAN, *Primary Examiner.*

D. J. BREZNER, M. J. TULLY, *Assistant Examiners.*